United States Patent [19]

Ratheiser

[11] Patent Number: 4,487,508
[45] Date of Patent: Dec. 11, 1984

[54] EXTRUDER PROVIDED WITH PREHEATING STAGE

[75] Inventor: Heinz Ratheiser, Vienna, Austria

[73] Assignee: American Maplan Corporation, McPherson, Kans.

[21] Appl. No.: 561,583

[22] Filed: Dec. 14, 1983

[51] Int. Cl.³ .............................................. B29B 3/00
[52] U.S. Cl. ............................ 366/91; 264/DIG. 65; 366/97; 366/146; 425/200; 425/DIG. 39
[58] Field of Search ...................... 366/76, 77, 91, 96, 366/97, 98, 144, 149, 146; 425/204, 205, 200, DIG. 39; 264/DIG. 65; 432/139

[56] References Cited

U.S. PATENT DOCUMENTS

| | | | |
|---|---|---|---|
| 2,478,893 | 8/1949 | Brant | 366/146 |
| 3,957,255 | 5/1976 | Groom | 366/77 |
| 4,059,401 | 11/1977 | Hanslik | 264/DIG. 65 |
| 4,214,862 | 7/1980 | Kolossow | 366/76 |
| 4,385,883 | 5/1983 | Hanslik | 366/83 |

Primary Examiner—Robert W. Jenkins
Attorney, Agent, or Firm—Karl F. Ross; Herbert Dubno

[57] ABSTRACT

An extruder for polymeric materials, comprising a housing forming a mastication stage with one or more feedscrews, includes a preheating and premixing stage with a cylindrical chamber centered on a vertical axis which is eccentrically traversed by a supply passage for the feeding of polymeric material to the mastication stage. The chamber, which is heated from the outside, contains two mixing wheels jointly rotatable about the axis, each wheel having a plurality of raker arms projecting from a hub to the chamber periphery in an off-radial direction and with a tilt causing the arms of the upper wheel to draw incoming fresh material toward the axis and down into the orbit of the arms of the lower wheels which in turn drive the material toward the periphery and, to the extent that an outlet port leading to the mastication stage is obstructed, back into the orbit of the arms of the upper wheel for recirculation.

6 Claims, 4 Drawing Figures

EXTRUDER PROVIDED WITH PREHEATING STAGE

FIELD OF THE INVENTION

My present invention relates to an extruder of the type wherein a mastication stage, provided with one or more feed screws for plasticizing and shaping flowable thermoplastic or elastomeric material into a coherent article, is preceded by a pretreatment stage in which the oncoming polymeric material—usually supplied in granular form—is fused into a substantially homogeneous mass maintained at a desired degree of viscosity by being preheated to a suitably elevated temperature.

BACKGROUND OF THE INVENTION

As pointed out in commonly owned U.S. Pat. No. 4,385,883, issued May 31, 1983 to Wilhelm Hanslik, it has already been proposed to equip such extruders with a device comprising several dished and coaxially superposed heating plates whose bottoms are provided with relatively offset apertures and are individually scraped by bladed wheels rotatable about their common axis to let the material successively pass through the several heating stages constituted by these plates. Similar multistage heaters are known in the field of metallurgy for the roasting of sulfitic ores with or without chlorination.

Such an assembly of stacked heating plates has a relatively limited throughput rate and must therefore be of large dimensions to handle a substantial quantity of material to be treated. If one stage becomes defective, the entire stack must be disassembled to enable its replacement. Since the material passes through the stack only once, heating to high temperatures requires a large number of stages.

The Hanslik patent discloses and claims a pretreatment stage located in an extruder housing between an inlet for polymeric bulk material and a feedscrew for plasticising and masticating that material prior to discharging it under pressure to a shaping die. The pretreatment stage includes two juxtaposed or coaxially interfitted augers designed to circulate the incoming material from the inlet to a remote location and to deliver it from there to the entrance of a channel leading to a main housing part containing the feedscrew, this entrance lying in the vicinity of the inlet and communicating therewith via a passage enabling the recirculation of the material through a closed loop by the two augers upon obstruction of the channel.

The assembly of this prior patent, in which the pretreatment stage and the main housing part are surrounded by external heating means, operates very satisfactorily when used at or near its throughput capacity. With smaller production rates, however, that device becomes less efficient so that its utilization in such cases is not very economical.

OBJECT OF THE INVENTION

The object of my present invention, therefore, is to provide a simplified assembly for premixing and preheating the polymeric material with recurrent recirculation, to the extent that the material cannot be immediately processed by the associated mastication stage, in order to achieve a maximum of homogeneity and thermal uniformity of the flowable mass delivered to that stage.

SUMMARY OF THE INVENTION

Such a pretreatment stage comprises, in accordance with my present invention, a preheating and premixing chamber which is provided with external heating means and is bounded by horizontal top and bottom walls as well as by a peripheral wall. An upper wheel and a lower wheel juxtaposed in the chamber are centered on a common vertical axis about which the wheels are jointly rotatable by associated drive means; advantageously, the peripheral wall is centered on the same axis so that the chamber is cylindrical. The top and bottom walls are respectively provided with an inlet port and an outlet port forming part of a passage through which flowable polymeric material is supplied to the associated mastication stage which may or may not be provided with additional heating means and includes one or more feedscrews working into a shaping die as is well known in the art. The upper and lower wheels respectively have a set of first raker arms and a set of second raker arms, the first raker arms sweeping the interior of the chamber adjacent its top wall and in the area of the inlet port while the second raker arms sweep the interior of the chamber adjacent the bottom wall and in the area of the outlet port. The first raker arms have an off-radial orientation drawing incoming polymeric material toward the axis while the second raker arms have an off-radial orientation driving the material from the vicinity of the axis toward the peripheral chamber wall for re-engagement by the first raker arms of any part of that material which is not discharged through the outlet port into the mastication stage.

According to a more particular feature of my invention, the raker arms of both sets are blade-shaped and partly twisted so that polymeric material drawn inwardly by the upper wheel is urged into the orbit of the raker arms of the lower wheel which in turn tend to lift the outwardly driven material back into the orbit of the first raker arms.

BRIEF DESCRIPTION OF THE DRAWING

The above and other features of my invention will now be described in detail with reference to the accompanying drawing in which.

SPECIFIC DESCRIPTION

Figure 1:
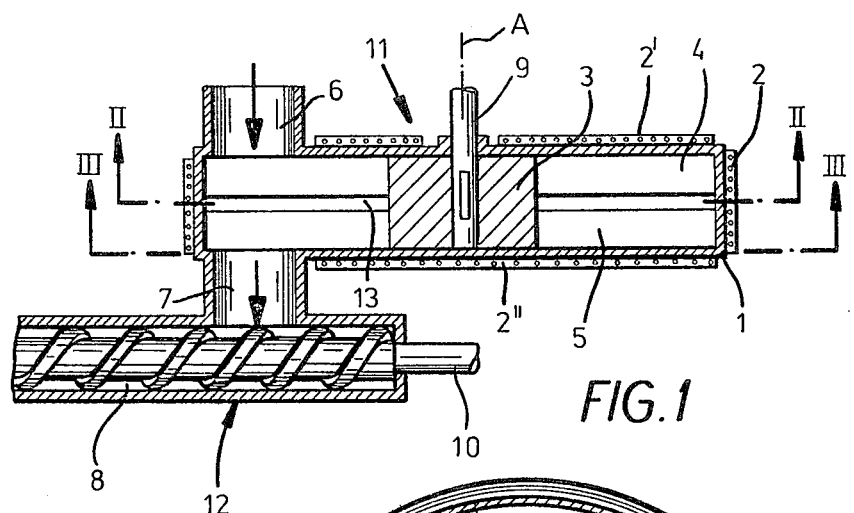
FIG. 1 is an axial sectional view of a pretreatment stage and of part of a mastication stage of an extruder assembly embodying the present improvement.
Figure 2:
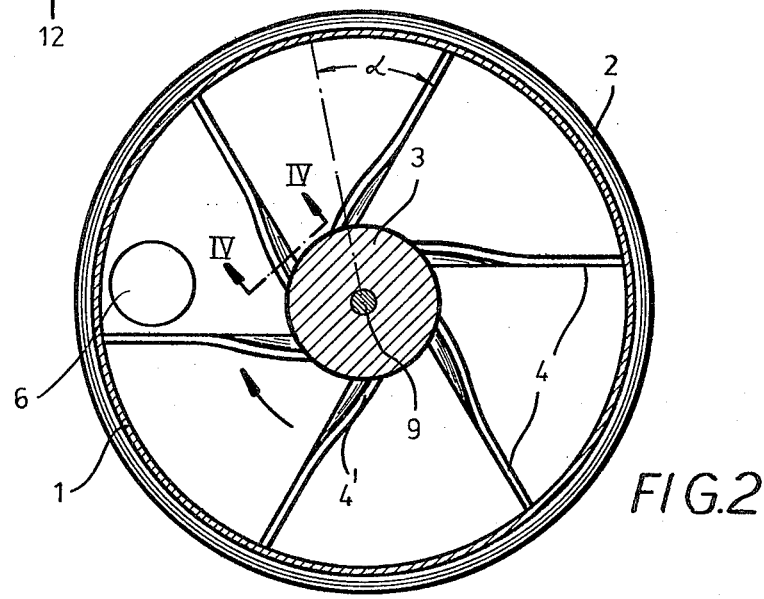
FIGS. 2 and 3 are axial sectional views respectively taken on lines II—II and III—III of FIG. 1.
Figure 3:
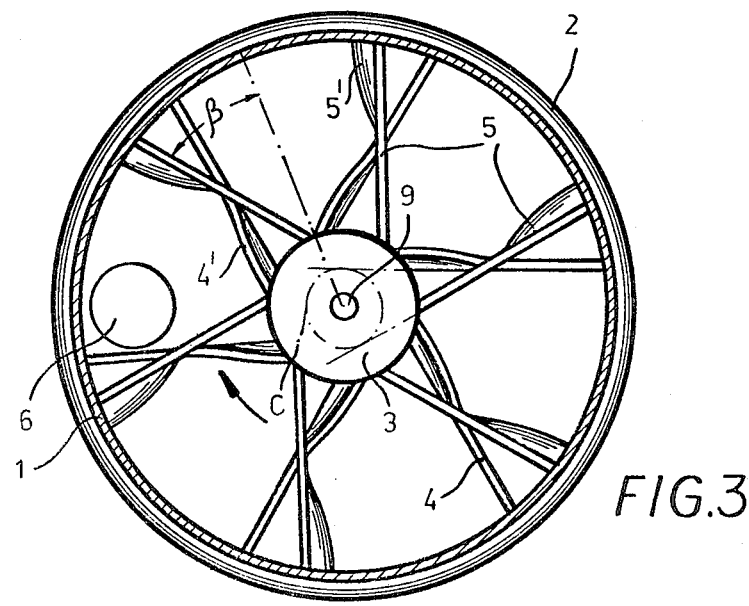

As shown in FIG. 1, an extruder according to my invention comprises a housing 1 forming a pretreatment stage 11 which overlies a masticating and plasticizing stage 12. Stage 11 is a flat, pancake-shaped structure comprising a cylindrical chamber 13 centered on a vertical axis A, this chamber being bounded by a top wall covered with a heating layer 2', a bottom wall covered with a heating layer 2" and a peripheral wall surrounded by a heating band 2. A shaft 9 extending along axis A is keyed to a hub 3 inside the chamber and forms part of the drive means for rotating that hub about the axis with the aid of a nonillustrated motor. Hub 3 is common to two stacked wheels jointly rotatable by shaft 9, namely an upper wheel with six raker arms 4 and a lower wheel with as many raker arms 5 equispaced about the hub. With the two wheels assumed to rotate clockwise as seen from below in the views of FIGS. 2 and 3, each arm 4 deviates from a radial direction by a small leading angle α while each arm 5 deviates from such a direction by a similar lagging angle β. As indicated in phantom lines in FIG. 3, the leading adges of these blade-shaped arms have extensions that are tangent to an imaginary cylinder C (of lesser diameter than hub 3) centered on axis A. The outer ends of all arms 4 and 5 are seen to sweep along the peripheral wall of chamber 13; these ends, however, could also be joined to a common cylindrical rim of small thickness closely spaced from that peripheral wall, although that has not been illustrated.

The upper wall of chamber 13 is provided with an eccentric inlet port 6 through which granular polymeric material is introduced by way of a nonillustrated hopper such as that shown in the above-identified Hanslik patent. The lower chamber wall has an outlet port 7, registering with inlet port 6, through which pretreated polymeric material is fed to an extrusion cylinder 8 of mastication stage 12 containing a feedscrew 10 which may be driven by the same motor as shaft 9 for rotating at a predetermined speed ratio with reference to wheel hub 3. Polymeric material entering through port 6 is entrained by the rapidly revolving raker arms 4 of the upper wheel toward the hub 3 where it descends into the lower part of the chamber for outward entrainment by the raker arms 5 of the other wheel.

Figure 4:
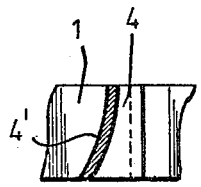
FIG. 4 is a sectional detail view taken on the line IV—IV of FIG. 2.

Furthermore, as best seen in FIG. 4, the inner extremities of the upper arms 4 are twisted out of their vertical off-radial planes in a manner exerting a downward force component upon a flowable mass filling the chamber 13. Conversely, the outer extremities of the lower arms 5 are twisted in the opposite sense to impart an upward force component upon that mass. This twisting of the arms facilitates a repeated recirculation of the polymeric material by the two wheels, the proportion of the recirculated material being determined by the rate at which the feedscrew 10 can carry off the material entering the cylinder 8 via outlet port 7. This rate can be adjusted, for example, by varying the speed ratio between feedscrew 10 and hub 3; alternatively, or in addition, outlet port 7 may be equipped with an adjustable dosing device such as a manually adjustable shutter or a spring-loaded gate as disclosed in the Hanslik patent.

The raker arms 4 and 5 need not be essentially rectilinear, as shown, but could also be given a certain curvature letting them approach the hub 3 along spiral lines.

If desired, cylinder 8 may be surrounded with an additional heater as likewise shown in the Hanslik patent.

The premixing stage 11 supplies the preheated and homogenized material, delivered to it in comminuted form as powder, granules, scraps, chips or the like, exclusively by gravity and with low friction to the underlying mastication stage 12. Its compact shape readily enables its installation on an existing extruder. Heaters 2, 2', 2", when worn, can be conveniently replaced; the recurrent recirculation of the plastic material allows them to operate—electrically or fluidically—with relatively low power.

I claim:

1. In an extruder having a housing forming a mastication stage provided with feedscrew means for shaping a flowable polymeric material into a coherent article, said mastication stage communicating with a passage supplying said polymeric material to said feedscrew means, the combination therewith of a preheating and premixing chamber bounded by horizontal top and bottom walls and by a peripheral wall, said chamber being provided with external heating means, an upper wheel and a lower wheel juxtaposed in said chamber and centered on a common vertical axis, and drive means for jointly rotating said wheels about said axis, said top and bottom walls being respectively provided with an inlet port and an outlet port forming part of said passage, said upper wheel having a set of first raker arms sweeping the interior of said chamber adjacent said top wall and in the area of said inlet port with an off-radial orientation drawing incoming polymeric material toward said axis, said lower wheel having a set of second raker arms sweeping the interior of said chamber adjacent said bottom wall and in the area of said outlet port with an off-radial orientation driving said polymeric material from the vicinity of said axis toward said peripheral wall for re-engagement by said first raker arms of any part of said polymeric material not discharged through said outlet port into said mastication stage.

2. The combination defined in claim 1 wherein said chamber is cylindrical and centered on said axis, said first and second raker arms extending to said peripheral wall.

3. The combination defined in claim 2 wherein said inlet and outlet ports are aligned with each other in the vicinity of said peripheral wall.

4. The combination defined in claim 1 wherein said upper and lower wheels are provided with a common hub, said first and second raker arms emanating from said hub.

5. The combination defined in claim 4 wherein said raker arms are blade-shaped, said first raker arms being provided in the vicinity of said hub with a twist urging the inwardly drawn polymeric material down into the orbit of said second raker arms, the latter being provided near their outer ends with a twist tending to lift the outwardly driven polymeric material back into the orbit of said first raker arms.

6. The combination defined in claim 4 wherein said first and second raker arms have leading edges with extensions tangent to an imaginary cylinder centered on said axis.

* * * * *